US012546826B2

(12) United States Patent
Mueller et al.

(10) Patent No.: US 12,546,826 B2
(45) Date of Patent: Feb. 10, 2026

(54) FAILURE INSERTION UNIT

(71) Applicant: dSPACE GmbH, Paderborn (DE)

(72) Inventors: Bjoern Mueller, Paderborn (DE); Tobias Schaeffer, Paderborn (DE)

(73) Assignee: dSPACE GmbH, Paderborn (DE)

( * ) Notice: Subject to any disclaimer, the term of this patent is extended or adjusted under 35 U.S.C. 154(b) by 180 days.

(21) Appl. No.: 18/370,623

(22) Filed: Sep. 20, 2023

(65) Prior Publication Data

US 2024/0094294 A1    Mar. 21, 2024

(30) Foreign Application Priority Data

Sep. 21, 2022    (DE) ...................... 10 2022 124 165.3

(51) Int. Cl.
*G01R 31/00*    (2006.01)
*G01R 31/319*    (2006.01)

(52) U.S. Cl.
CPC . *G01R 31/31924* (2013.01); *G01R 31/31926* (2013.01)

(58) Field of Classification Search
CPC . G06F 11/2733; G06F 11/2205; G01R 31/14; G01R 31/327; G01R 31/31924; G01R 31/31926
See application file for complete search history.

(56) References Cited

U.S. PATENT DOCUMENTS

| 4,333,049 | A | * | 6/1982 | Yui | G01R 19/0092 324/121 R |
|---|---|---|---|---|---|
| 8,494,803 | B2 | | 7/2013 | Hasse et al. | |
| 9,720,032 | B2 | * | 8/2017 | Chen | G01R 31/2834 |
| 10,191,113 | B2 | * | 1/2019 | Hasse | G06F 11/26 |
| 2006/0161827 | A1 | * | 7/2006 | Gohel | G01R 31/31924 714/736 |
| 2012/0187969 | A1 | * | 7/2012 | Hess | H02H 9/042 324/537 |

FOREIGN PATENT DOCUMENTS

DE    102009048981 A1    4/2011

OTHER PUBLICATIONS

Bub et al; "Automotive High-Speed Interfaces: Future Challenges for System-level HV-ESD Protection and First-Time-Right Design"; Jun. 21, 2023.

(Continued)

*Primary Examiner* — Thang X Le

(74) *Attorney, Agent, or Firm* — Muncy, Geissler, Olds & Lowe, P.C.

(57) ABSTRACT

A failure insertion unit for connection to an object under test connected to a bus or network interface, wherein the object under test can be subjected by means of the failure insertion unit to fault voltages that are greater than the maximum voltage for which the bus or network interface is designed, with a fuse circuit which protects a bus or network interface connected to the failure insertion unit from voltages that are greater than the maximum voltage for which the bus or network interface is designed. This provides a way to be able to use failure insertion units even in systems that work with buses with high bandwidths without the risk of damaging bus or network interfaces due to overvoltages.

18 Claims, 2 Drawing Sheets

(56) References Cited

OTHER PUBLICATIONS

Implementation of Open TC8 with CANoe, vTeststudion and VT System, Version 1.0; Vector Informatik GmbH: Apr. 18, 2019.
Dspace; "DS5395 Automotive Ethernet FIU Module Hardware Installation and Configuration", Jun. 2022.
Pickeringtest.com; PXI/PXIe 1000Base-T1 Fault Insertion Switch 40/42-203; Issue 1.2 May 2022.
VT System User Manual (Version 2.9), Vector Informatik GmbH Mar. 29, 2022.

* cited by examiner

FAILURE INSERTION UNIT

This nonprovisional application claims priority under 35 U.S.C. § 119(a) to German Patent Application No. 10 2022 124 165.3, which was filed in Germany on Sep. 21, 2022, and which is herein incorporated by reference.

BACKGROUND OF THE INVENTION

Field of the Invention

The invention relates to a failure insertion unit for connection to an object under test connected to a bus or network interface, wherein the object under test can be subjected by means of the failure insertion unit to fault voltages that are greater than the maximum voltage for which the bus or network interface is designed.

Description of the Background Art

So-called HIL simulators are known from the prior art which are used in particular for testing control units ("HIL" derived from "Hardware in the Loop"). HIL simulators each comprise at least one computer unit, wherein the computer unit or computer units have in particular the task of executing models which at least partially reproduce an environment of an electronic device or of a more complex technical system.

HIL simulators thus enable a test method in which an embedded system, in particular an electronic control unit (ECU), or a mechatronic module is connected via its inputs and outputs to an adapted counterpart, namely, the HIL simulator, which is used to simulate the real environment of the embedded system. In the context of a HIL simulation, the embedded system is also referred to as the object under test, i.e. DUT (device under test). Thus, during testing of the embedded system, at least part of the input signals for the embedded system is provided by the HIL simulator and at least part of the output signals of the embedded system is sent to the HIL simulator.

For example, the temporal behavior of the environment of the system under test can be replicated by means of an environment model executed on a HIL simulator. If, e.g., a HIL simulator is to test an embedded system, in particular a control unit, then the HIL simulator is designed as an at least partial reproduction of the real environment of the control unit. Thus, in this case, the HIL simulator can communicate with the control unit via its inputs and outputs equipped with a bus or network interface or via bidirectional communication channels and can thus function as an adapted counterpart of the control unit.

The HIL simulation usually has to run in real time and is used in development to shorten development times and save costs. In particular, recurring processes can be simulated and/or automated. This has the advantage that a new development version of a control or regulation program can be tested under the same criteria as the previous version. Thus, it can be proven in detail whether an error has been eliminated or not. Tests on real systems, such as on a braking system of a motor vehicle, can thus be greatly reduced and, in addition, system limits can be determined without endangering the real system and its users (e.g., car and driver).

The HIL simulation is always only a simplification of reality and therefore cannot replace the test on the real system. If too large discrepancies occur between a HIL test and reality, the underlying models in the simulation are oversimplified. Then the simulation models must be further developed.

An essential part of HIL testing is fault simulations to test the response of the control unit in fault situations. In order to simulate cable breaks or similar faults, additional plug-in cards are usually available for HIL systems or external devices that can also be connected to the HIL systems, e.g., via bus or network interfaces, so-called Failure Insertion Units (FIUs). They comprise circuits with switches that can be controlled remotely and automatically to simulate, e.g., cable breaks, short circuits, reversed control unit connections, and/or a so-called contact bounce which can lead to an unwanted modulation. FIUs are available for both sensors and actuators, wherein for actuators they are additionally combined with load devices. Such simulation signals in particular that represent non-normal, therefore, faulty operating states, can be generated by the FUIs. Thus, an electrical component can be tested not only with respect to a normal operation, but also with respect to different error and/or malfunction states. Such an FUI is described, e.g., in DE 10 2009 048 981 A1, which corresponds to US 2011/0087477, which is incorporated herein by reference.

This document describes a device for testing an electronic component, having a simulation device for generating a simulation signal, a testing device for connecting the electronic component, two connecting devices, and a selection device for selecting the connecting device, wherein the simulation device and the testing device can be connected in an electrically conductive manner to one of the connecting devices by means of the selection device and the individual connecting devices differ from one another with regard to at least one electrical property. In this regard, the simulation device is designed such that simulation signals can be generated for different operating states of the electronic component and, in particular, simulation signals can be provided for faulty operating states of the electrical component by means of an FUI.

In an FIU, the signal lines are typically connected to the ground potential or the positive potential line, i.e., to 0 V or to up to +60 V, so that an object under test can be subjected to an appropriate voltage. The signal lines, especially in bus or network connections, typically operate at lower voltages, for example, at voltages less than or equal to 5 V. Although the communication transceivers required for the buses are usually protected against overvoltage, there is the risk that high voltages from an FIU will irreversibly destroy them, which would render the bus interfaces of the simulator or of the control units under test unusable.

The previously mentioned problem of bus transceivers not withstanding the maximum voltages used in the FIU without damage is well known. Until now, the individual channels of the bus and network interfaces were therefore protected against overvoltages. This means that passive components were built into the signal path of the bus or network interfaces in the form of a protective circuit.

A protective circuit is an additional electrical circuit which is formed of various electronic components and ensures that damaging high voltages, which arise, e.g., when electromagnetic devices are switched off, do not occur. A protective circuit is therefore intended to reduce, e.g., voltage peaks in such a way that no components are damaged. Components that do not influence normal operating processes but can dissipate interference voltages or interference currents are used as protective circuits. Protective circuits are well known from the technical field of automotive electrics and from many fields of electrical control engineering.

The previously mentioned solution of providing bus or network interfaces with a protective circuit works well with buses that operate at lower speeds and with low bandwidths, such as the low-speed CAN bus. A solution, known from practice, for the CAN bus provides a protection circuit in front of the CAN transceiver of the interface card. This protection circuit is formed of a semiconductor device that, when an excessive voltage is detected, creates a short circuit before the transceiver input with use of an analog circuit to protect it. In addition, the input is disconnected by means of a relay after the overvoltage is detected. This approach requires measuring resistors in the signal path to be able to detect high currents. These resistors can be overloaded due to a high current in the case of a short circuit. In addition, depending on the external wiring, high self-induction voltages can occur after the protective relay before the transceiver input opens.

In addition, the higher the bandwidths of the buses and thus also the frequencies used for the buses, the more disruptive the protective circuits are. With the use of higher speed buses and networks, such as Ethernet, it is no longer possible to integrate such a protective circuit on a network interface card, as such protective circuits would degrade signal integrity such that communications would be disrupted to an intolerable extent. Therefore, in the past it was problematic to use FIUs on buses with higher bandwidths, especially in combination with Ethernet.

SUMMARY OF THE INVENTION

It is therefore an object of the invention to provide a way to be able to use failure insertion units even in systems that work with buses with high bandwidths without the risk of damaging bus or network interfaces, especially of the HIL simulator, due to overvoltages.

According to an example of the invention, a failure insertion unit is thus provided for connection to an object under test connected to a bus or network interface, wherein the object under test can be subjected by means of the failure insertion unit to fault voltages that are greater than the maximum voltage for which the bus or network interface is designed, with a fuse circuit which protects a bus or network interface, connected to the failure insertion unit, from voltages that are greater than the maximum voltage for which the bus or network interface is designed.

In the conventional solution described above, all bus signals are always routed through the fuse circuit even when the failure insertion unit is not activated. This always results in poor signal integrity values, regardless of whether or not a fault is switched, or whether or not a failure insertion unit is connected to the object under test at all. In contrast, in the invention the fuse circuit is moved to the failure insertion unit. This means that the fuse circuit is only used if a fault is also switched. Because signal integrity is unimportant anyway when the fault is switched, the fuse circuit does not affect the bus behavior.

The layout of the invention has a further advantage: In the conventional solution described above, the fuse circuit is installed at each interface, which also means additional production and component costs in addition to a poorer signal behavior. This means that in the prior art, a high-quality fuse circuit is always installed, regardless of whether the interface is used at all in combination with a failure insertion unit. In the invention, the effort is shifted to the failure insertion unit, therefore, where it is actually always needed. As a result, therefore, it is an essential aspect of the invention to provide the fuse circuit not where a device is to be protected, but to place it where the danger to the device to be protected arises.

Such a failure insertion unit can now be designed in different ways. The failure insertion unit can have inputs for connection to supply voltage lines and outputs for connection to the object under test for applying a fault voltage to the object under test, wherein provided as a fuse circuit is a protective circuit arranged between the inputs and the outputs, which is designed in such a way that voltage peaks or high voltages applied for testing are reduced in such a way that no voltages occur at the outputs that would damage a bus or network interface, for example, of a HIL simulator, which interface is connected to the object under test.

A plurality of outputs can be maintained at the failure insertion unit. For example, the object under test can be connected to the bus or network interface (e.g., interface of a HIL simulator) via at least one further output of the failure insertion unit.

Therefore, a protective circuit known can be provided as the fuse circuit, but it is not arranged in the bus or network interface but in the failure insertion unit itself. In this regard, according to a preferred refinement of the invention, a plurality of different protection circuits, each for a different bus or network interface, are arranged between the inputs and outputs, wherein the protective circuits are designed in such a way that, with regard to the respective bus or network interface for which they are provided, voltage peaks are reduced in such a way that no voltages occur at the outputs that would damage a respective bus or network interface connected to the object under test, and wherein each of said protective circuits is selectively activatable to function in the failure insertion unit.

If in the present case it is stated that a plurality of different protective circuits, each provided for a different bus or network interface, are arranged between the inputs and outputs, the term "different bus or network interface" means a different type of interface, e.g., Ethernet on the one hand and FlexRay on the other hand.

In addition, it means that each of these protective circuits can be activated to function in the failure insertion unit, that the protective circuits can be activated individually, specifically, in each case those that correspond to the respective bus or network types present in the existing bus or network interface. A universally usable failure insertion unit is provided in this way which can be used with different types of bus or network interfaces.

It is possible to manually activate one of the protective circuits offered by the failure insertion unit to function in the failure insertion unit. According to a preferred refinement of the invention, however, the failure insertion unit is provided with a detection and activation device with which it is possible to detect what kind of bus or network interface is connected to the object under test and with which the respective protective circuit provided for the respective bus or network interface can be activated. This example significantly reduces the risk of activating such a protective circuit that is not suitable for the particular bus or network interface.

In addition, it is provided that the protective circuit is variable with respect to the maximum voltage possible at the outputs, so that this maximum voltage is adjustable.

Moreover, the protective circuit can be used to determine the fault voltage to be applied to the object under test before the object under test is subjected to the fault voltage, wherein with the protective circuit the fault voltage can be output to the outputs only if the fault voltage is below such a voltage that would damage a bus or network interface connected to the object under test. This example of the invention provides particular security that the object under test is in fact not subjected to such voltages for which the object under test is not designed and which would therefore with a high probability result in damage to the object under test.

The failure insertion unit can be provided with inputs for connection to supply voltage lines, first outputs for connection to the object under test for applying a fault voltage to the object under test, and second outputs for connecting the object under test, connected to the first outputs, to the bus or network interface, wherein a switching device which is arranged between the first outputs and the second outputs and with which a connection between the first outputs and the second outputs can be switched is provided as a fuse circuit. The switching device can thus be used to connect the first outputs to the second outputs in an electrically conductive manner and also to disconnect them again. This makes it possible to disconnect the connection to the bus or network interface before the fault voltage is applied, so that the object under test can be subjected to the fault voltage while at the same time the bus or network interface is completely protected.

This approach of the invention is very universal and does not require configuration of a protective circuit depending on the bus or network interface used. The timely disconnection from the bus or network interface is preferably controlled by a suitable logic (implemented on an FPGA or other suitable computing unit) provided on the failure insertion unit or on a HIL simulator connected to the failure insertion unit. The disconnection is switched, for example, due to a signal to apply a fault voltage, perhaps from the HIL simulator or from a host PC connected to the HIL simulator, or due to a measurement of an unacceptably high voltage.

If the connection is a multi-core connection, the switching device is designed to enable simultaneous switching of multiple cores.

The switching device can be set up such that it disconnects the connection between the first outputs and the second outputs before a fault voltage is applied to the object under test via the first outputs and again closes the connection after the fault voltage has been applied.

The bus or network interface can basically be any interface. However, according to a preferred refinement of the invention, the failure insertion unit is provided for an interface which is an Ethernet interface. In particular, according to a preferred refinement of the invention, the bus or network interface is designed for a maximum voltage of 5 V. For such bus or network interfaces, the use of the failure insertion unit of the invention is particularly efficient.

The invention also relates to a method of using the failure insertion unit for a HIL simulator.

In other respects, the invention relates to a HIL simulator with a previously described failure insertion unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
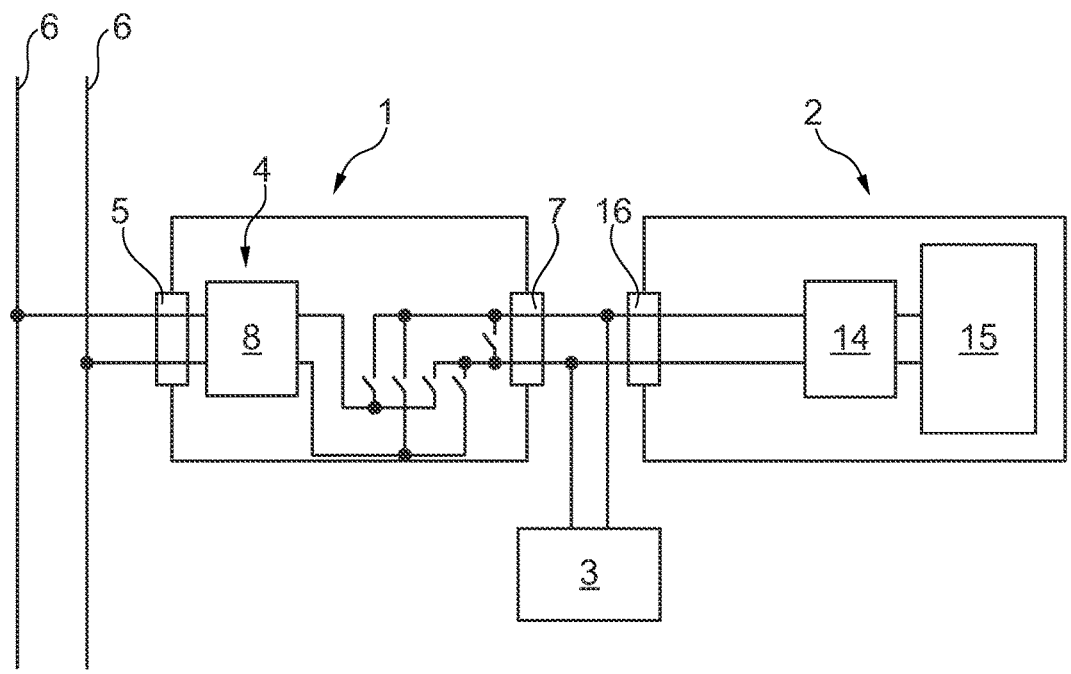
FIG. 1 schematically shows a failure insertion unit according to an example of the invention.

A failure insertion unit 1 according to an example of the invention can be seen schematically in FIG. 1. Failure insertion unit 1 is connected to a bus or network interface 2 and to an object under test 3 via outputs 7. The connection to bus or network interface 2 is made via a connector 16 of bus or network interface 2, which connector leads to a transceiver 14, which is also referred to as a communication transceiver and which in turn is connected further to the actual controller 15 of bus or network interface 2. Whereas conventional bus or network interfaces are sometimes provided with a protective circuit for protection against high voltages, in the present case a bus or network interface 2 is provided that does not have such a protective circuit.

Rather, failure insertion unit 1 is provided with a fuse circuit 4 in the form of a protective circuit 8. It is assured in this way that the voltages to be applied to object under test 3 and thus also to bus or network interface 2 are not greater than the maximum voltage for which bus or network interface 2 is designed. In other words, protective circuit 8 limits the voltages supplied to failure insertion unit 1 via supply voltage lines 6 connected to inputs 5 of failure insertion unit 1. This also has the result that object under test 3 as well can only be subjected maximally to such high voltages as the respective bus or network interface 2 allows. Advantageously, however, destruction or damage of bus or network interface 2 by high voltages can be avoided with high probability.

Figure 2:
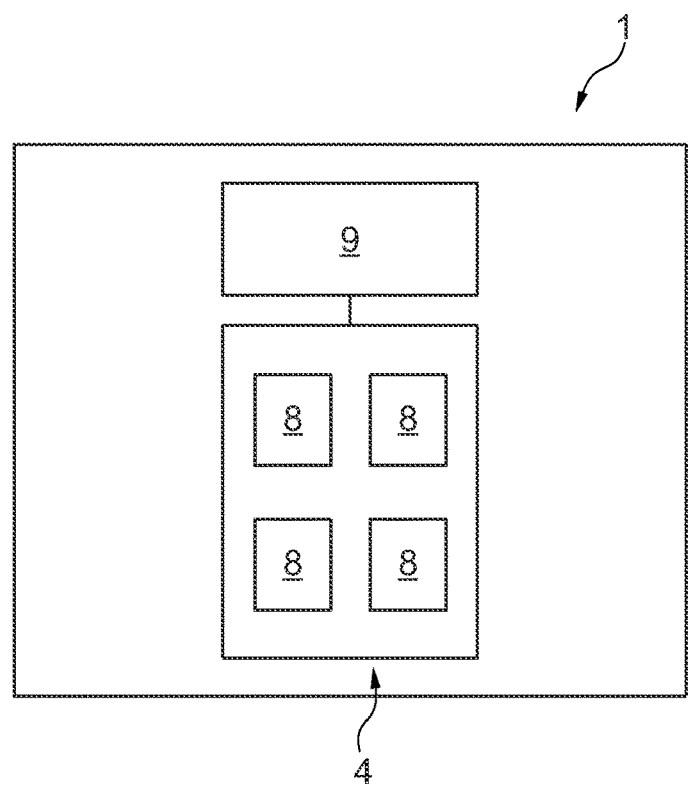
FIG. 2 shows a detection and activation device of the failure insertion unit of FIG. 1 for selecting different protective circuits.

In FIG. 2, failure insertion unit 1 shown in FIG. 1 is given a special design in that a plurality of different protective circuits 8 are arranged between inputs 5 and outputs 7. These different protective circuits 8 are each provided for a different type of a bus or network interface. In this way, a universally applicable failure insertion unit 1 is provided, in which in each case such an adjustment can be made that is suitable for the respective type of the connected bus or network interface 2. In order to select the respective suitable protective circuit 8, failure insertion unit 1 has a detection and activation device 9 with which it is possible to detect what type of bus or network interface 2 is connected to object under test 3 and with which then the respective protective circuit 8 suitable for the respective bus or network interface 2 can be activated.

In addition, failure insertion unit 1 shown in FIG. 1 has a function according to which protective circuit 8 can be used to determine the fault voltage to be applied to object under test 3, namely, before object under test 3 is actually subjected to this fault voltage. In this way, it can be provided that the fault voltage is output to outputs 7 only if the fault voltage is below such a voltage that would damage bus or network interface 2 connected to object under test 3.

Figure 3:
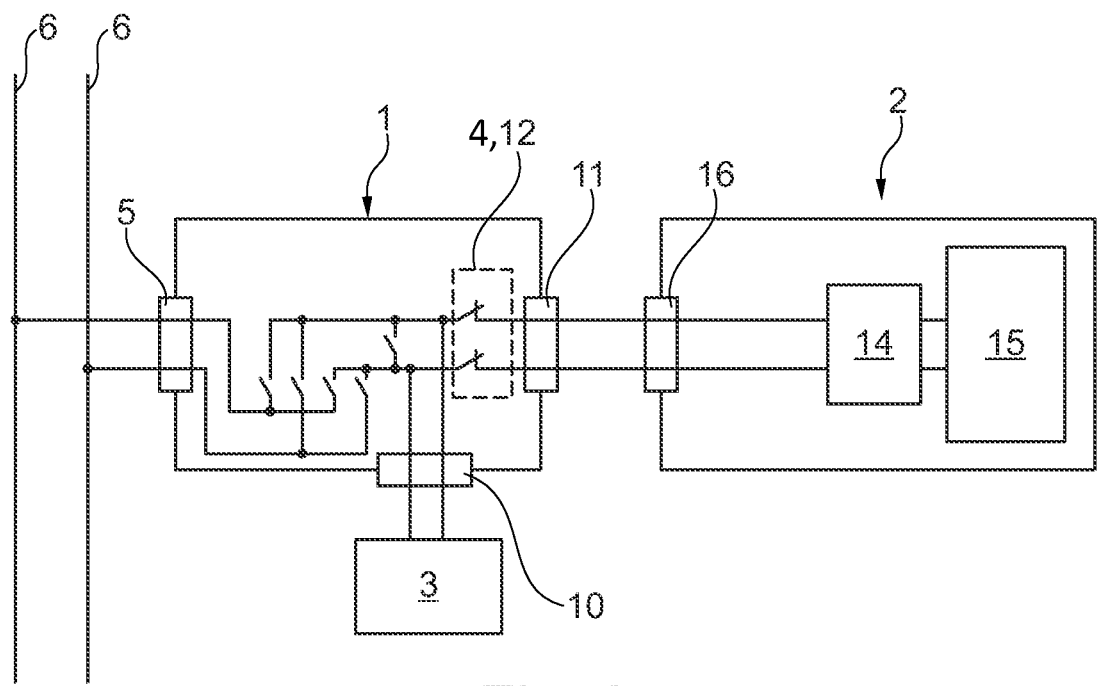
FIG. 3 schematically shows a failure insertion unit according to an example of the invention.

A failure insertion unit 1 according to an example of the invention can now be seen schematically in FIG. 3. This failure insertion unit 1 does not require a protective circuit 8. Rather, it is the case here that, in addition to inputs 5 for connection to supply voltage lines 6, failure insertion unit 1 has, on the one hand, first outputs 10 for connection to object under test 3 for applying the fault voltage to object under test 3 and, on the other hand, second outputs 11 for connecting object under test 3, connected to first outputs 10, to bus or network interface 2. In order to ensure that bus or network interface 2 is protected against excessively high voltages, a switching device 12 is arranged as a fuse circuit 4 between first outputs 10 and second outputs 11. This switching device 12 is designed such that it can be used to switch the connection between first outputs 10 and second outputs 11. Thus, an electrically conductive connection between first outputs 10 and second outputs 11 can be established and opened again with switching device 12.

In this way, such an operation of failure insertion unit 1 is possible, according to which the connection to bus or network interface 2 is disconnected before a fault voltage is applied to object under test 3. Furthermore, this example also enables the object under test 3 not to be protected by the fuse circuit from high voltages and thus actually to be subjected to voltages higher than fault voltages, which is sometimes necessary depending on the envisaged test.

Figure 4:
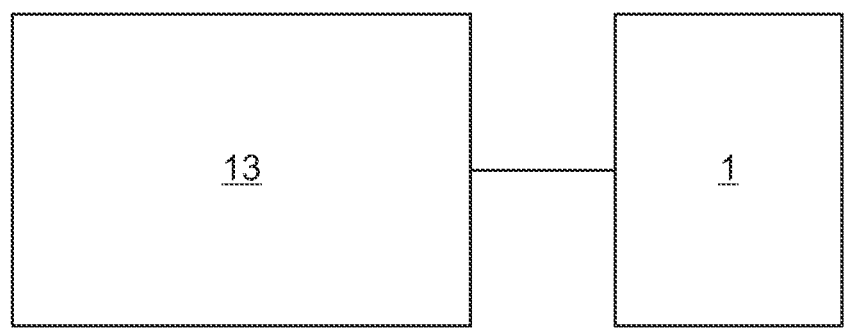
FIG. 4 shows the use of a failure insertion unit according to an example of the invention for a HIL simulator.

Finally, it should again be pointed out that, a use of a failure insertion unit 1, such as can be seen, e.g., in FIG. 1 or in FIG. 3, may be provided for a HIL simulator 13, which can be seen schematically in FIG. 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A failure insertion unit for connection to an object under test connected to a bus or network interface, the failure insertion unit comprising:
    a fuse circuit that protects a bus or network interface connected to the failure insertion unit from voltages that are greater than a maximum voltage for which the bus or network interface is designed,
    wherein the object under test is adapted to be subjected by the failure insertion unit to fault voltages that are greater than the maximum voltage for which the bus or network interface is designed.

2. The failure insertion unit according to claim 1, further comprising:
    at least two inputs for connection to supply voltage lines; and
    at least two outputs for connection to the object under test to apply a fault voltage to the object under test,
    wherein, provided as the fuse circuit is a protective circuit arranged between the inputs and the outputs, the protective circuit configured such that voltages are reduced in such a way that no voltages occur at the outputs that would damage a bus or network interface connected to the object under test.

3. The failure insertion unit according to claim 1, wherein a plurality of different protective circuits, each provided for a different bus or network interface, are arranged between the inputs and the outputs, wherein the protective circuits are designed such that, with regard to the respective bus or network interface for which they are provided, voltages are reduced in such a way that no voltages occur at the outputs that would damage a respective bus or network interface connected to the object under test, and wherein at least one of these protective circuits is selectively activatable to function in the failure insertion unit.

4. The failure insertion unit according to claim 3, wherein the failure insertion unit has a detection and activation device with which it is possible to detect what kind of bus or network interface is connected to the object under test and with which the respective protective circuit provided for the respective bus or network interface is activated.

5. The failure insertion unit according to claim 2, wherein the protective circuit is variable with respect to the maximum voltage possible at the outputs so that this maximum voltage is adjustable.

6. The failure insertion unit according to claim 2, wherein the protective circuit is used to determine the fault voltage to be applied to the object under test before the object under test is subjected to the fault voltage, and wherein the protective circuit is used to output the fault voltage to the outputs only if the fault voltage is below a voltage that would damage a bus or network interface connected to the object under test.

7. The failure insertion unit according to claim 1, further comprising:
    at least two inputs to connect to supply voltage lines;
    at least two first outputs to connect to the object under test for applying a fault voltage to the object under test;
    at least two second outputs to connect the object under test, which is connected to the first outputs, to the bus or network interface; and
    a switching device arranged between the first outputs and the second outputs, and with which a connection between the first outputs and the second outputs is switched, is provided as a fuse circuit.

8. The failure insertion unit according to claim 7, wherein the switching device is set up such that it disconnects the connection between the first outputs and the second outputs before a fault voltage is applied to the object under test via the first outputs and again closes the connection after the fault voltage has been applied.

9. The failure insertion unit according to claim 1, wherein the bus or network interface is an Ethernet interface.

10. The failure insertion unit according to claim 1, wherein the bus or network interface is designed for a maximum voltage of 5 V.

11. The failure insertion unit according to claim 1, wherein the failure insertion unit is connected to a HIL simulator.

12. A HIL simulator comprising the failure insertion unit according to claim 1.

13. The failure insertion unit according to claim 1, wherein a plurality of different protective circuits, are arranged between the inputs and the outputs.

14. The failure insertion unit according to claim 13, wherein the different protective circuits are each provided for a different bus or network interface.

15. The failure insertion unit according to claim 13, wherein the protective circuits are designed such that voltages are reduced in such a way that no voltages occur at the outputs that would damage a respective bus or network interface connected to the object under test.

16. The failure insertion unit according to claim 13, wherein at least one of these protective circuits is selectively activatable to function in the failure insertion unit.

17. The failure insertion unit according to claim 1, wherein the protective circuit is used to determine the fault voltage to be applied to the object under test before the object under test is subjected to the fault voltage.

18. The failure insertion unit according to claim 1, wherein the protective circuit is used to output the fault voltage to an output only if the fault voltage is below a voltage that would damage a bus or network interface connected to the object under test.

* * * * *